United States Patent [19]
Chen et al.

[11] Patent Number: 5,794,857
[45] Date of Patent: Aug. 18, 1998

[54] FEED NOZZLE

[75] Inventors: Ye-Mon Chen, Sugar Land; Thomas Shawn Dewitz, Houston, both of Tex.

[73] Assignee: Shell Oil Company, Houston, Tex.

[21] Appl. No.: 399,868

[22] Filed: Mar. 7, 1995

[51] Int. Cl.$^6$ .............................. B05B 7/04; C10G 11/18
[52] U.S. Cl. ............... 239/430; 239/554; 239/559; 208/113
[58] Field of Search .................. 239/429, 430, 239/433, 434.5, 548, 554, 556–559, 567, 568, 589, 597; 208/113, 157

[56] References Cited

U.S. PATENT DOCUMENTS

| | | | |
|---|---|---|---|
| 218,337 | 8/1879 | Thomas | 239/434.5 X |
| 243,473 | 6/1881 | Thomas | 239/434.5 X |
| 709,443 | 9/1902 | Stewart | 239/434.5 X |
| 719,573 | 2/1903 | Fageol | 239/434.5 |
| 772,016 | 10/1904 | Woodford | 239/434.5 X |
| 1,451,811 | 4/1923 | Brown | 239/434.5 X |
| 3,071,540 | 1/1963 | McMahon et al. | |
| 4,331,533 | 5/1982 | Dean et al. | |
| 4,498,629 | 2/1985 | Grondman | 239/434.5 |
| 4,511,087 | 4/1985 | Matsumoto | 239/430 X |
| 4,687,642 | 8/1987 | Nielsen | 422/140 |
| 4,800,014 | 1/1989 | Hays et al. | 208/157 |
| 5,017,343 | 5/1991 | Cetinkaya | 422/140 |
| 5,173,175 | 12/1992 | Steffens et al. | 239/597 X |
| 5,240,183 | 8/1993 | Bedaw et al. | 239/403 |

FOREIGN PATENT DOCUMENTS

| | | | |
|---|---|---|---|
| 423876 A1 | 4/1991 | European Pat. Off. | |
| 389 | 3/1872 | Italy | 239/434.5 |
| 13932 | 2/1897 | Switzerland | 239/430 |

OTHER PUBLICATIONS

David L. Johnson et al., "New Nozzle Improves FCC Feed Atomization, Unit Yield Patterns," *Oil & Gas Journal*, Oct. 24, 1994, pp. 80–86.

*Primary Examiner*—Lesley D. Morris

[57] ABSTRACT

A feed nozzle for introducing steam and a heavy petroleum hydrocarbon into a reactor, including a nozzle body having a cylindrical inner steam conduit; and having an annular outer heavy petroleum hydrocarbon conduit, a first nozzle tip fixedly attached to the outlet end of the inner steam conduit, for the passage of the steam out of the inner steam conduit and into the heavy petroleum hydrocarbon, resulting in a mixture of steam and heavy petroleum hydrocarbon, the hemi-spherical outlet end; having a row comprising a plurality of holes therein for the passage of the steam out of the inner steam conduit and into the heavy petroleum hydrocarbon passing through the outer heavy petroleum hydrocarbon conduit, resulting in a mixture of steam and heavy petroleum hydrocarbon; a second nozzle tip fixedly attached to the outer heavy petroleum hydrocarbon conduit, for passage of the mixture of steam and heavy petroleum hydrocarbon out of the feed nozzle assembly; the second nozzle tip being adapted to atomize the mixture of steam and heavy petroleum hydrocarbon, the second nozzle tip having a hemi-spherical outlet end, for passage of the mixture of steam and heavy petroleum hydrocarbon out of the feed nozzle assembly; wherein the hemi-spherical outlet end of the second nozzle tip extends beyond the hemi-spherical outlet end of the first nozzle tip, the hemi-spherical outlet end of the second nozzle tip having an elongated slit for passage of the mixture of steam and heavy petroleum hydrocarbon out of the feed nozzle assembly.

9 Claims, 5 Drawing Sheets

FEED NOZZLE

RELATED APPLICATIONS

This application is related to Assignee's co-pending application, Ser. No. 08/535,850, filed Sep. 28, 1995.

FIELD OF THE INVENTION

The invention relates to a feed nozzle for introducing fluids into a vessel, particularly for introducing steam and hydrocarbon feed stock into a catalytic cracking unit.

BACKGROUND OF THE INVENTION

Many oil refinery and chemical plant units utilize nozzles for distributing liquid and/or gaseous feed to the unit. In some units, the ability of the nozzle to distribute the feed to the unit is very important to the productivity of the unit. For example, a catalytic cracking unit is a reactor for cracking large chain hydrocarbon molecules found in crude oil into smaller and more valuable commercial products such as gasoline range hydrocarbons and diesel oils. Typically, vacuum distillates are introduced through feed nozzles in an upflow riser reactor where the feed is contacted with regenerated particulate solid catalysts. The catalyst selectively aids desirable cracking reactions.

For peak performance of the reactor, it is essential that the nozzle distribute the feed in a fine spray having a uniform coverage and a narrow droplet size distribution. Such a spray increases the surface area of the feed droplets and facilitates contacting with the catalyst particles. Existing nozzles have difficulty, however, in achieving this desired performance. Some nozzles use very small openings or complex tip design which easily plugged by various impurities in the feed. The down time and replacement expense in repairing such a blockage is very disadvantageous. Existing nozzles cannot produce fine droplets and/or a desirable spray pattern.

Accordingly, it would be advantageous to have a nozzle capable of achieving a narrow distribution of fine droplets, a thin layer of spray, and not having a tendency for blockage.

SUMMARY OF THE INVENTION

The invention includes a feed nozzle for introducing steam and a heavy petroleum hydrocarbon into a reactor, including a nozzle body having a substantially cylindrical inner steam conduit; and having a substantially annular outer heavy petroleum hydrocarbon conduit, a first nozzle tip fixedly attached to the outlet end of the inner steam conduit, for the passage of the steam out of the inner steam conduit and into the heavy petroleum hydrocarbon, resulting in a mixture of steam and heavy petroleum hydrocarbon the substantially hemi-spherical or hemi-elliptical outlet end having a row including a plurality of passageways therein for the passage of the steam out of the inner steam conduit and into the heavy petroleum hydrocarbon passing through the outer heavy petroleum hydrocarbon conduit, resulting in a mixture of steam and heavy petroleum hydrocarbon; a second nozzle tip fixedly attached to the outer heavy petroleum hydrocarbon conduit, for passage of the mixture of steam and heavy petroleum hydrocarbon out of the feed nozzle assembly; the second nozzle tip being adapted to atomize the mixture of steam and heavy petroleum hydrocarbon, the second nozzle tip having a substantially hemi-spherical or hemi-elliptical outlet end, for passage of the of steam and heavy petroleum hydrocarbon out of the feed nozzle assembly; where the substantially hemi-spherical or hemi-elliptical outlet end of the second nozzle tip extends beyond the substantially hemi-spherical or hemi-elliptical outlet end of the first nozzle tip, the substantially hemi-spherical or hemi-elliptical outlet end of the second nozzle tip having at least two elongated slits for passage of the mixture of steam and heavy petroleum hydrocarbon out of the feed nozzle assembly.

DETAILED DESCRIPTION OF THE INVENTION

An aspect of the instant invention is a device for feeding a heavy petroleum hydrocarbon into a catalytic cracker riser reactor.

A. NOZZLE BODY

The nozzle apparatus includes a nozzle body having a substantially typically annular outer heavy petroleum hydrocarbon conduit. The heavy petroleum hydrocarbon conduit; has an overall outer diameter of from about 2 inches to about 9 inches, or 4 inches to about 9 inches or about 5 inches to about 7 inches in typical embodiments. The outer surface of the inner steam conduit forms an inner surface of the annular outer heavy petroleum hydrocarbon conduit. Each of the conduits has an inlet end and an opposite outlet end.

The nozzle body is typically oriented horizontally, vertically, or diagonally into the riser reactor. Other orientations are possible. When vertically oriented, the nozzle body typically will extend upward from the bottom or inlet end of the reactor. When not vertical, the nozzle body will typically protrude through the walls of the reactor in an orientation between vertical and horizontal. Different orientations will typically require different outlet designs since the ideal spray pattern depends on the nozzle orientation. The nozzle assembly of the invention is suited for any of these orientations since the configuration of the outlet end slits can be modified to achieve the desired spray pattern.

Typically with a vertically oriented nozzle body, the outlet slits will be a half-moon or crescent shape or other non-linear shape in order to configure the spray to fit the conduit. In a side entry nozzle body, the outlet slits are substantially straight lines when viewed from straight on as in FIG. 5B.

B. FIRST NOZZLE TIP

1. Inlet End

A first nozzle tip is fixedly attached to the outlet end of the inner steam conduit, for the passage of the steam out of the inner steam conduit and into the heavy petroleum hydrocarbon passing through the outer heavy petroleum hydrocarbon conduit. The attachment is by any conventional means such as threaded attachment or welded attachment. Such attachment is also applicable to other fixedly attached elements of the apparatus. The passage of the steam into the hydrocarbon results in a mixture of steam and heavy petroleum hydrocarbon. The first nozzle tip typically has a substantially cylindrical inlet end for attachment to the outlet end of the inner steam conduit.

2. Outlet End

Opposite the inlet end of the first nozzle tip is an outlet end. The outlet end is typically a substantially hemi-spherical or hemi-elliptical outlet end. It is for passage of the steam out of the inner steam conduit and into the heavy petroleum hydrocarbon passing through the outer heavy petroleum hydrocarbon conduit. This results in a mixture of steam and heavy petroleum hydrocarbon.

3. Outlet PassageWays

The typically hemi-spherical or hemi-elliptical outlet end typically has at least one opening or passageway corresponding with each elongated outlet in the outlet end of the second nozzle tip. For example, if the second nozzle tip has two elongated outlet passageways, then the first nozzle tip will have at least two corresponding openings or passageways, e.g., slits.

Typically the openings in the first nozzle tip will consist of at least one row of small holes which line up with each corresponding elongated slit in the second nozzle tip. However, the first nozzle tip may have more than one row of holes corresponding to each elongated slit in the second nozzle tip. Each row preferably has from about seven to about fifteen holes having diameters from about 1/16" to about 1/4". The openings in the first nozzle tip are for the passage of the steam out of the inner steam conduit and into the heavy petroleum hydrocarbon passing through the outer heavy petroleum hydrocarbon conduit. This results in a mixture of steam and heavy petroleum hydrocarbon.

The angle formed from the substantially spherical or elliptical center of the typically substantially hemi-spherical or hemi-elliptical outlet end through the length of the two rows including a plurality of passageways therein is typically from about 45° to about 120°, preferably about 75° to about 105°.

C. SECOND NOZZLE TIP

1. Inlet End

A second nozzle tip is fixedly attached to the outer heavy petroleum hydrocarbon conduit. The function of this second nozzle tip is for passage of the mixture of steam and heavy petroleum hydrocarbon out of the feed nozzle. The second nozzle tip is adapted to substantially uniformly atomize the mixture of steam and heavy petroleum hydrocarbon into a catalytic cracking reactor riser. The second nozzle tip has an inlet end for attachment to the outlet end of the outer heavy petroleum hydrocarbon conduit. The inlet end is typically substantially cylindrical.

2. Outlet End

Opposite the inlet end of the second nozzle tip is a substantially typically hemi-spherical or hemi-elliptical outlet end, for passage of the mixture of steam and heavy petroleum hydrocarbon out of the feed nozzle. The hemi-spherical or hemi-elliptical outlet end of the second nozzle tip extends beyond the hemi-spherical or hemi-elliptical outlet end of the first nozzle tip. The distance the hemi-spherical or hemi-elliptical outlet end of the second nozzle tip extends beyond the hemi-spherical or hemi-elliptical outlet end of the first nozzle tip is adapted to substantially uniformly atomize said mixture of steam and heavy petroleum hydrocarbon into a catalytic cracking reactor riser. This distance is typically from about one-quarter inch to about one and one-quarter inches, preferably about one-half inch to about one inch. The substantially hemi-spherical or hemi-elliptical outlet end of the second nozzle tip has one, and preferably at least two, elongated slits therein for passage of the mixture of steam and heavy petroleum hydrocarbon out of the feed nozzle.

3. Outlet Passageways

The elongated slits, optionally and preferably, have substantially parallel walls along their length. The angle formed from the substantially typically spherical or hemi-elliptical center of the substantially hemi-spherical or hemi-elliptical outlet end of the second nozzle tip through the length of the elongated slits is preferably substantially contiguous with the angle formed from the substantially spherical or elliptical center of the substantially hemi-spherical or hemi-elliptical outlet of the first nozzle tip through the width of the two rows including a plurality of passageways therein.

4. Erosion-Resistant Overlay

Optionally, an erosion-resistant material, e.g., STELLITE, is used as an overlay at erosion sensitive areas of the elongated slits and outlet end. Typically, such areas are the portions of the elongated slits and outlet end in contact with catalyst particles. Such particles are abrasive and thus an erosion resistant overlay prolongs the life of the outlet end.

D. PROCESS OF USING THE NOZZLE APPARATUS

1. Overview

In the process for catalytically cracking a heavy petroleum hydrocarbon a heavy petroleum hydrocarbon is preheated, mixed with steam, and fed into a catalytic cracking reactor riser. The heavy petroleum hydrocarbon is then contacted with a cracking catalyst to produce light hydrocarbons and spent catalyst coated with a fine coke layer. The light hydrocarbons are removed from the reactor. A portion of the spent catalyst coated with a fine coke layer is passed to a regenerator reactor. At least a portion of the coke is then burned off the spent catalyst. This results in a regenerated catalyst.

2. Feeding Steam

Steam is passed through the substantially cylindrical inner steam conduit and mixes with the heavy petroleum hydrocarbon. This result in the forming of a fine two-phase mixture of steam bubbles jetting through the hydrocarbon mixture.

The passageways out of the outlet end of the steam conduit do not foul. Fouling due to coking of the heavy petroleum feed is avoided since the flow of heavy petroleum feed around the outside of the outlet end of the steam conduit has a cooling heat transfer function. Thus, the temperature at the passageways is sufficiently low that the contact of steam and heavy petroleum does not result in coking and blockage of the passageways.

3. Passing Feed Mixture Into Reactor

The fine two-phase mixture passes through the feed nozzle outlet into the catalytic cracking reactor. One benefit of the nozzle assembly of this invention is that, for example, where two outlet slits are used, two sheet-like fans of spray are produced which, possibly due to a vacuum effect between them, converge into one sheet while still in close proximity to the tip or outlet. Thus, fine atomization is obtained while also achieving a desirable uniform spray pattern, i.e., a flat sheet when the nozzle outlets are straight lines. It is noted that theorization as to the scientific principle which produces the single sheet of spray is not meant to limit the invention as other explanations may be applicable.

DETAILED DESCRIPTION OF THE DRAWINGS

Figure 1:
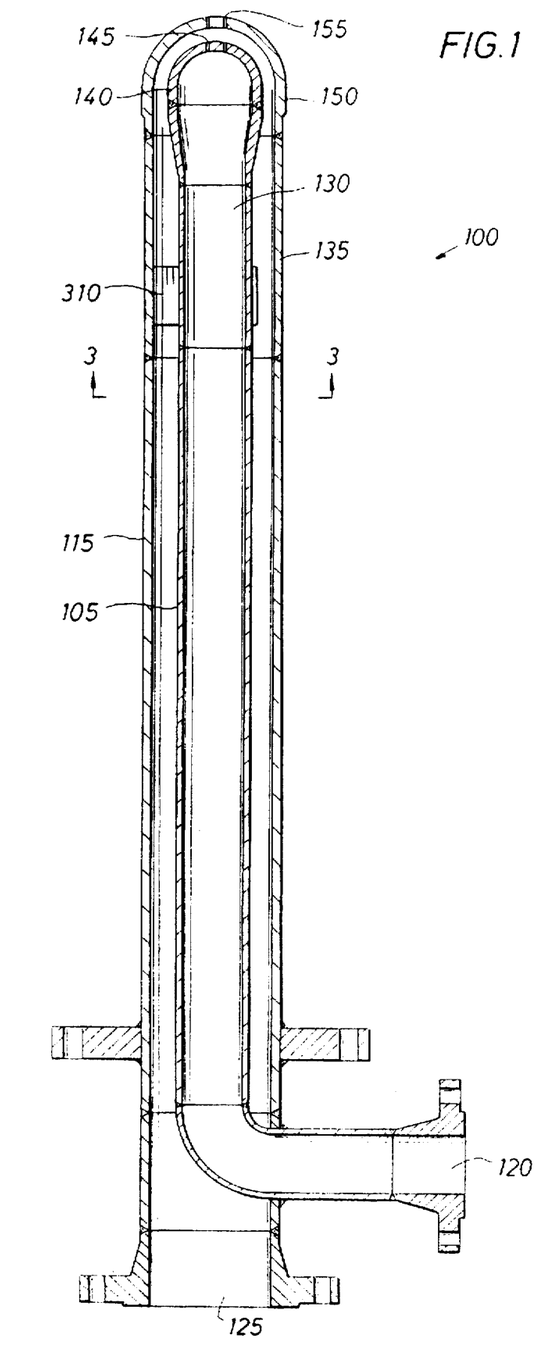
FIG. 1 is a sectional elevation view of one embodiment of the invention taken along the longitudinal axis.

A. FIG. 1

FIG. 1 depicts a side sectional view of one embodiment of the invention. Feed nozzle assembly 100 includes inner steam conduit 105 and outer substantially spherically or elliptically annular oil conduit 115. Inner steam conduit 105 has inlet end 120 and outlet end 130. Outer annular oil conduit 115 has inlet end 125 and outlet end 135.

First nozzle tip 140 is attached at its inlet end to outlet end 130 of inner steam conduit 105. The outlet end of first nozzle tip 140, opposite its inlet end, is a substantially hemi-spherical or hemi-elliptical outlet end. The outlet end of first nozzle tip 140 has, in one embodiment, two rows of a plurality of passageways 145 for the passage of steam.

Second nozzle tip 150 is attached at its inlet end to outlet end 135 of outer annular oil conduit 115. The end of second nozzle tip 150 opposite its inlet end is a substantially hemi-spherical or hemi-elliptical outlet end. The outlet end of second nozzle tip 150 has, in one embodiment, two slits 155 for the passage of the feed and steam.

Figure 2:
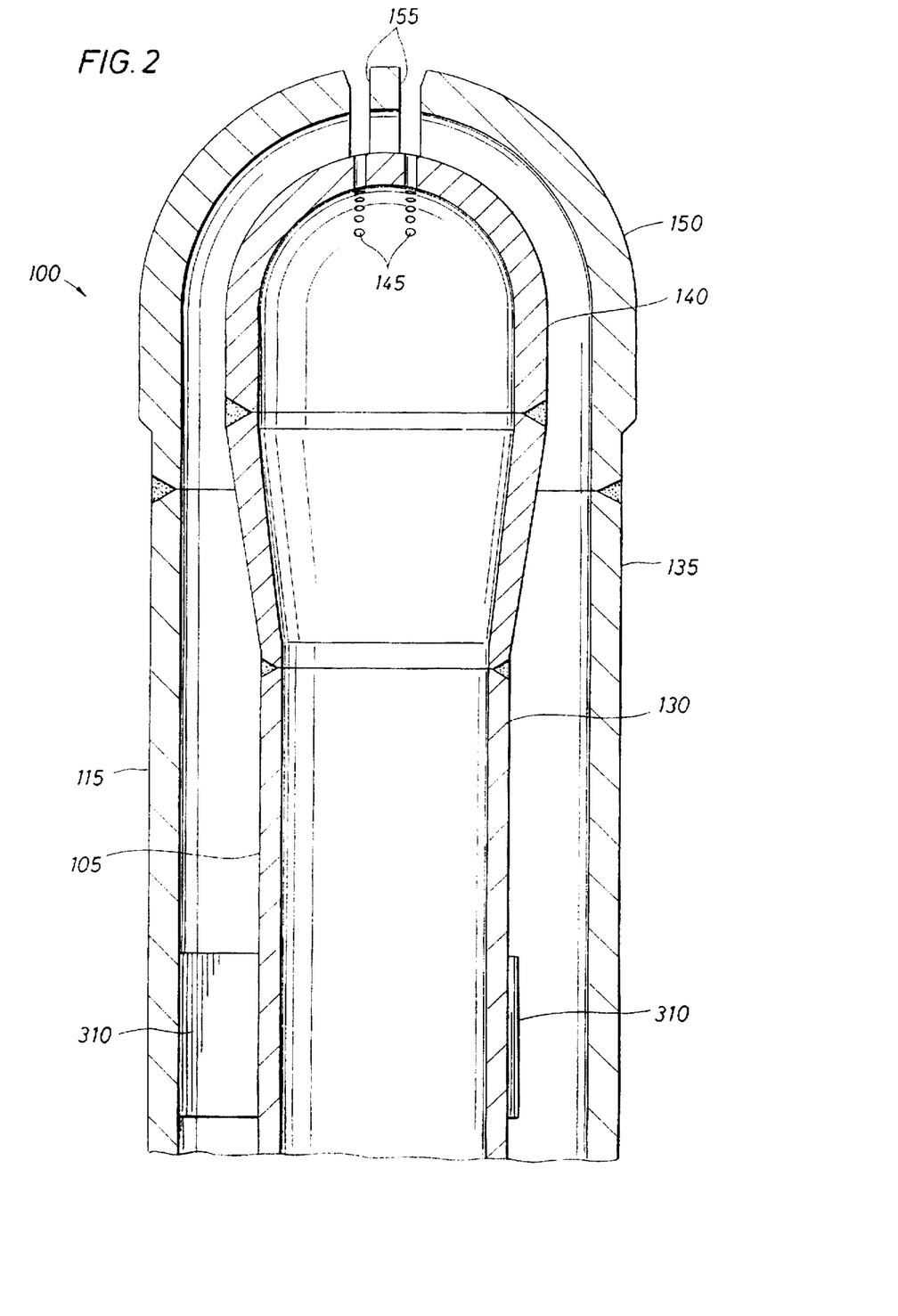
FIG. 2 is an enlarged sectional view of the nozzle tips of FIG. 1.

B. FIG. 2

FIG. 2 shows an enlarged view, in one embodiment, depicting the first and second nozzles. The numbering of these elements is the same as used in FIG. 1.

Figure 3:
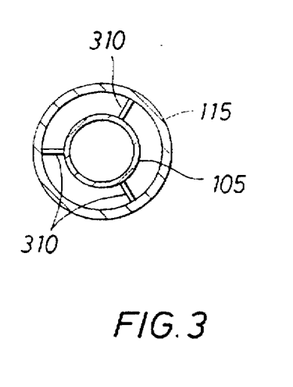
FIG. 3 is a sectional view taken along the lines 3—3 of FIG. 1.

C. FIG. 3

FIG. 3 shows a cross-sectional view, taken along line 3—3 of FIG. 1, of one embodiment of the feed nozzle assembly. Inner steam conduit 105 and outer annular oil conduit 115 are fixedly joined by spacer studs 310.

Figure 4A:
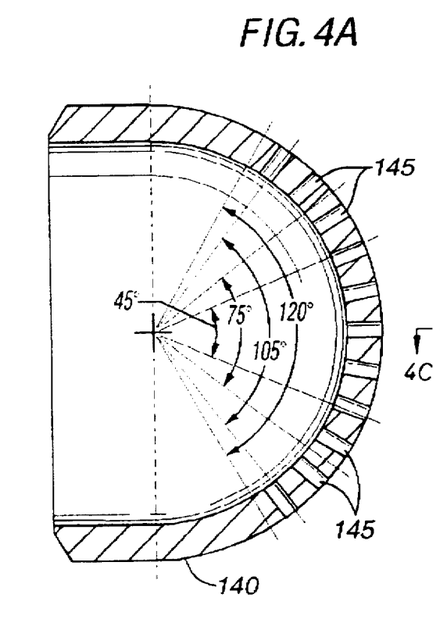
FIG. 4A is a sectional view of the steam nozzle taken along the lines 4A—4A of FIG. 4B.
Figure 4B:
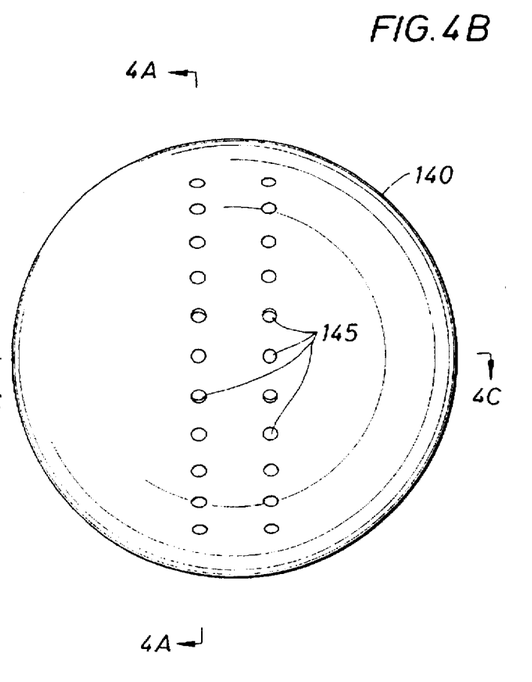
FIG. 4B is a plan view of the steam nozzle of FIG. 1.
Figure 4C:
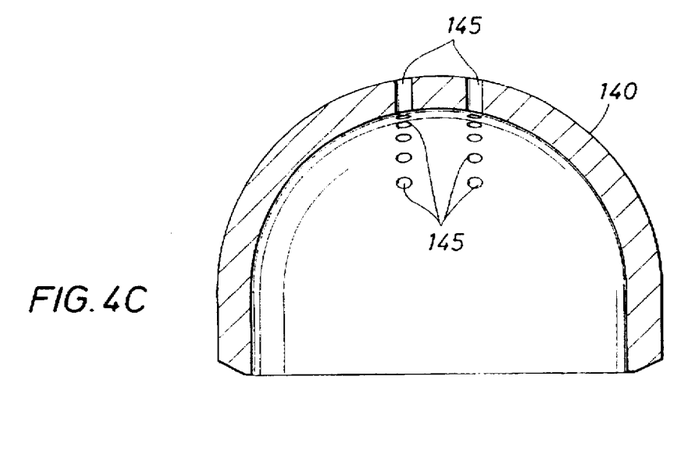
FIG. 4C is a sectional view of the steam nozzle taken along the line 4C—4C of FIG. 4B.

D. FIGS. 4A, 4B, and 4C

FIGS. 4A, 4B, and 4C show various views of first (steam) nozzle tip 140 along with rows of passageways 145 therethrough.

Figures 5A, 5B, 5C:
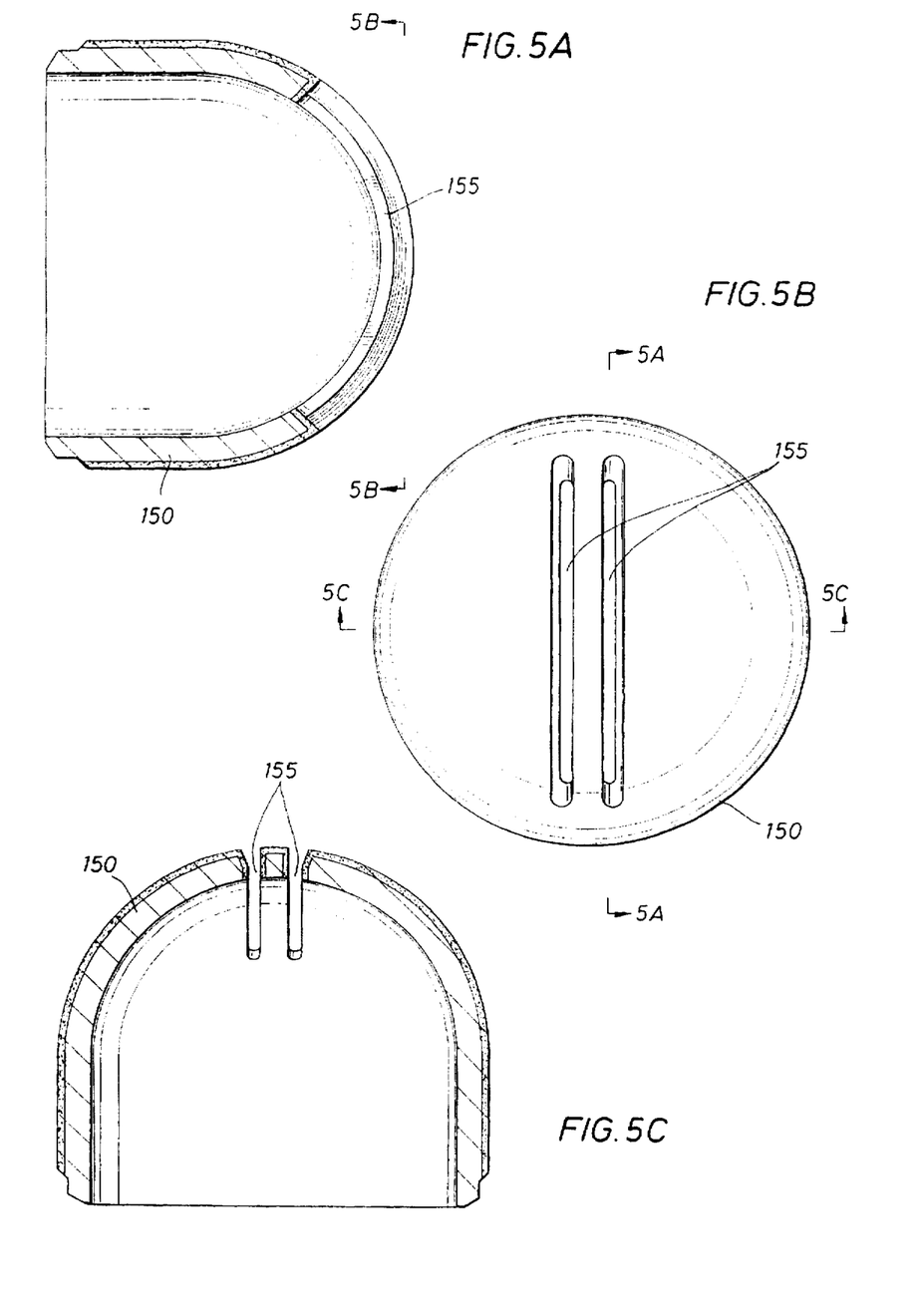
FIG. 5A is a sectional view of the hydrocarbon feed nozzles taken along the line 5A—5A of FIG. 5B.
FIG. 5B is a plan view of the hydrocarbon feed nozzle of FIG. 1.
FIG. 5C is a sectional view of the hydrocarbon feed nozzle taken along the line 5C—5C of FIG. 5B.

E. FIGS. 5A, 5B, and 5C

FIGS. 5A, 5B and 5C show various views of second (hydrocarbon feed) nozzle tip 150 along with slits 155 therein.

ILLUSTRATIVE EMBODIMENT(S)

The invention is further described in the following illustrative embodiment(s). The illustrative embodiment(s) are for illustrative purposes only and are not intended to limit the scope of the invention in any way.

Figure 6A:
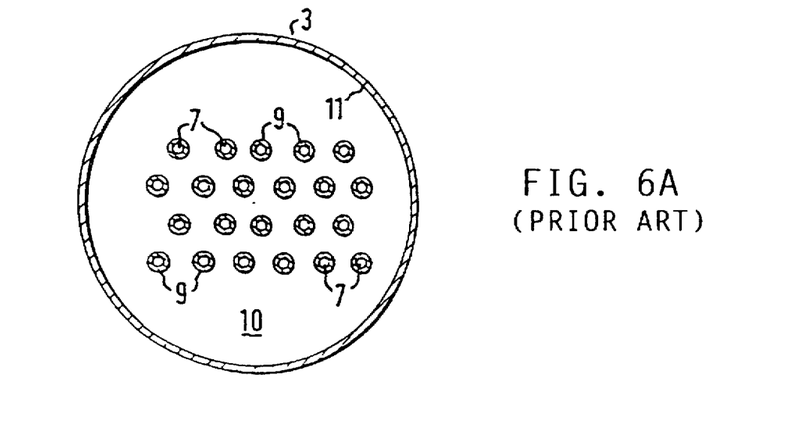
FIGS. 6A and 6B depicts a known nozzle from European Patent Application No. 0423876A1.
Figure 6B:
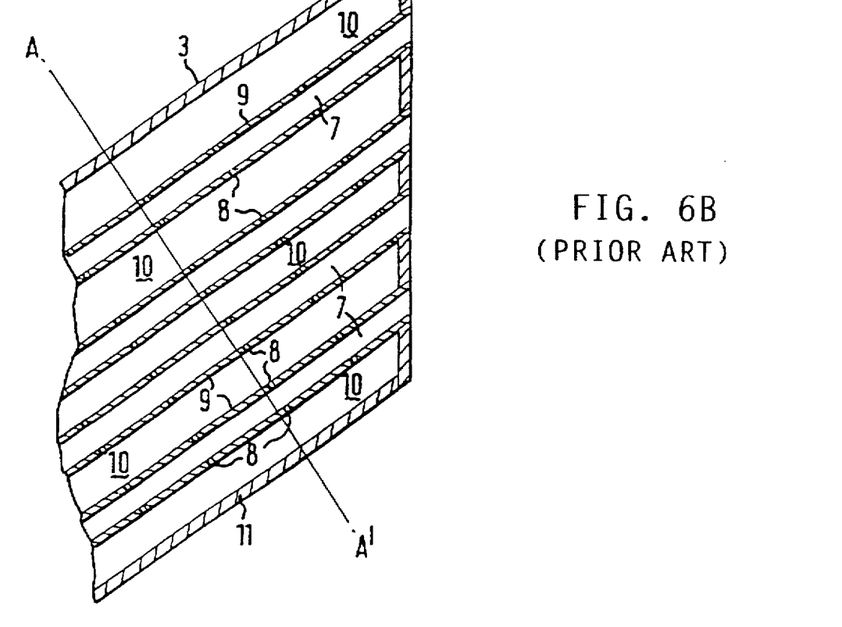

In the following illustrative embodiment an experiment was run to compare the numerous performance factors which resulted from operation of one embodiment of the nozzle apparatus of the invention with that of a known nozzle as depicted in European Patent Application No. 0423876A1, as depicted in FIGS. 6A and 6B.

For simplification of the experiment air and water were used rather than steam and a heavy petroleum hydrocarbon. Air was fed into the steam conduit and water was fed into the heavy hydrocarbon petroleum annular conduit. Feed rates, feed pressures, and temperatures were substantially the same for the each nozzle.

The table below gives the results of the experiment.

|  | Known Nozzle: European Patent Application No. 0423876A1 | Nozzle Apparatus of the Invention |
|---|---|---|
| Droplet Size | Excellent | Excellent |
| Spray Uniformity | Poor - High spray density in multiple discrete jets, low spray density between jets | Excellent - Uniform spray density |
| Riser Reactor Coverage | Fair | Excellent - 50% greater than known nozzle |
| Expansion of Spray | Poor | Excellent - Fast expansion of fan spray |
| Contact Zone | Poor - Multiple layer contacting | Excellent - Single layer contacting |
| Operation Window | Fair - Limited turndown | Excellent - Unlimited turndown |
| Compactness | Fair | Excellent - 30% reduction over known nozzle |
| Operation Without Steam | Poor - No atomization | Good - Can function as a single phase atomizer |
| Maintenance | Poor - No access to steam orifices | Excellent - Direct access to steam orifices |

As shown in the results above, the nozzle apparatus of the invention had a superior performance in 8 of the 9 categories. Small droplet size is important since surface area is increased. A uniform spray is desirable since this results in uniform utilization of catalyst. The coverage of the spray in the reactor is significant since the greater the coverage the greater the contacting with the catalyst. A quick expansion of the spray is required to obtain contacting with more catalyst. A single contact zone of the spray with the catalyst is important in order to control the contact time of the catalyst with the feed. The "operation window" refers to the range of the ratio of steam to hydrocarbon feed over which the nozzle can effectively operate. A large range is desirable since fluctuations routinely occur in steam availability during normal refinery operations. Operation without any steam flow is useful in the case of a total steam outage. It is very useful in reducing turnaround and down time to be able to have quick access to the steam orifices since they may sometimes become obstructed.

What is claimed is:

1. A feed nozzle assembly for introducing steam and a heavy petroleum hydrocarbon into a catalytic cracking reactor riser, said feed nozzle assembly comprising:
   a. a nozzle body
      (1) having a substantially cylindrical inner steam conduit, said inner steam conduit having an inner surface and an outer surface;
      (2) having a substantially annular outer heavy petroleum hydrocarbon conduit, said heavy petroleum hydrocarbon conduit;
         (a) having an overall outer diameter from about 4 inches to about 9 inches; and
         (b) wherein said outer surface of said inner steam conduit forms an inner surface of said annular outer heavy petroleum hydrocarbon conduit;
      (3) wherein each of said conduits has an inlet end and an opposite outlet end;
   b. a first nozzle tip fixedly attached to said outlet end of said inner steam conduit, for passage of steam out of said inner steam conduit and into a heavy petroleum hydrocarbon passing through said outer heavy petroleum hydrocarbon conduit, thereby resulting in a mixture of steam and heavy petroleum hydrocarbon, said first nozzle tip
   (1) having a substantially cylindrical inlet end for attachment to the outlet end of said inner steam conduit;
   (2) having an opposite substantially hemi-spherical outlet end, for passage of said steam out of said inner steam conduit and into said heavy petroleum hydrocarbon passing through said outer heavy petroleum hydrocarbon conduit, thereby resulting in a mixture of steam and heavy petroleum hydrocarbon, said hemi-spherical outlet end having a center and;
      (a) having two rows comprising a plurality of passageways therein for passage of said steam out of said inner steam conduit and into said heavy petroleum hydrocarbon passing through said outer heavy petroleum hydrocarbon conduit, thereby resulting in a mixture of steam and heavy petroleum hydrocarbon.
      (b) wherein an angle formed from said center of said substantially hemi-spherical outlet end through a length of said two rows comprising a plurality of passageways therein is from about 45° to about 120°; and
c. a second nozzle tip fixedly attached to said outer heavy petroleum hydrocarbon conduit, for passage of said mixture of steam and heavy petroleum hydrocarbon out of said feed nozzle assembly wherein said second nozzle tip is adapted to substantially uniformly atomize said mixture of steam and heavy petroleum hydrocarbon into a catalytic cracking reactor riser, said second nozzle tip
   (1) having a substantially cylindrical inlet end for attachment to the outlet end of said outer heavy petroleum hydrocarbon conduit;
   (2) having an opposite substantially hemi-spherical outlet end said outlet end having a center, for passage of said mixture of steam and heavy petroleum hydrocarbon out of said feed nozzle assembly;
      (a) wherein said hemi-spherical outlet end of said second nozzle tip extends beyond said hemi-spherical outlet end of said first nozzle tip,
      (b) wherein a distance said hemi-spherical outlet end of said second nozzle tip extends beyond said hemi-spherical outlet end of said first nozzle tip is from about one-quarter inch to about one and one-quarter inches,
      (c) said hemi-spherical outlet end of said second nozzle tip having two elongated slits therein for passage of said mixture of steam and heavy petroleum hydrocarbon out of said feed nozzle assembly;
         (i) said elongated slits having substantially parallel walls along the length of said elongated slits;
      (d) wherein an angle formed from said center of said substantially hemi-spherical outlet end of said second nozzle tip through the length of said elongated slits is substantially contiguous with an angle formed from the substantially spherical center of said substantially hemi-spherical outlet of said first nozzle tip through the width of said two rows comprising a plurality of passageways therein.

2. A feed nozzle assembly for introducing a gas and a liquid into a vessel, said feed nozzle assembly comprising:
a. a nozzle body
   (1) having a substantially cylindrical inner gas conduit, said inner gas conduit having an inner surface and an outer surface;
   (2) having a substantially annular outer liquid conduit, wherein said outer surface of said inner gas conduit forms an inner surface of said annular outer liquid conduit; and
   (3) wherein each of said conduits has an inlet end and an opposite outlet end;
b. a first nozzle tip fixedly attached to said outlet end of said inner gas conduit, for passage of a gas out of said inner gas conduit and into a liquid passing through said outer liquid conduit, thereby resulting in a mixture of gas and liquid, said first nozzle tip
   (1) having a substantially cylindrical inlet end for attachment to the outlet end of said inner gas conduit;
   (2) having an opposite substantially hemi-spherical or hemi-elliptical outlet end, for passage of said gas out of said inner gas conduit and into said liquid passing through said outer liquid conduit, thereby resulting in a mixture of gas and liquid, said hemi-spherical or hemi-elliptical outlet end having a center; and
      (a) having at least one row comprising a plurality of passageways therein for the passage of said gas out of said inner gas conduit and into said liquid passing through said outer liquid conduit, thereby resulting in a mixture of gas and liquid,
      (b) wherein an angle formed from said center of said substantially hemi-spherical or hemi-elliptical outlet end through a length of said at least one row comprising a plurality of passageways therein is from about 75° to about 105°; and
      (c) comprised substantially of stainless steel; and
c. a second nozzle tip fixedly attached to said outer liquid conduit, for passage of said mixture of gas and liquid out of said feed nozzle assembly; wherein said second nozzle tip is adapted to substantially uniformly atomize said mixture of gas and liquid into said vessel, said second nozzle tip
   (1) having a substantially cylindrical inlet end for attachment to the outlet end of said outer liquid conduit;
   (2) having an opposite substantially hemi-spherical or hemi-elliptical outlet end, for passage of said mixture of gas and liquid out of said feed nozzle assembly;
      (a) wherein said hemi-spherical or hemi-elliptical outlet end of said second nozzle tip extends beyond said hemi-spherical or hemi-elliptical outlet end of said first nozzle tip,
      (b) wherein a distance said hemi-spherical or hemi-elliptical outlet end of said second nozzle tip extends beyond said hemi-spherical or hemi-elliptical outlet end of said first nozzle tip is from about one-quarter inch to about one and one-quarter inches.
      (c) said hemi-spherical or hemi-elliptical outlet end of said second nozzle tip having at least one elongated slit therein for passage of said mixture of gas and liquid out of said feed nozzle assembly;
         (i) said at least one elongated slit having substantially parallel walls along a length of said at least one elongated slit;

(d) wherein an angle formed from said center of said substantially hemi-spherical or hemi-elliptical outlet end of said second nozzle tip through the length of said at least one elongated slit is substantially contiguous with the angle formed from said center of said substantially hemi-spherical or hemi-elliptical outlet of said first nozzle tip through a width of said at least one row comprising a plurality of passageways therein; and (e) is comprised substantially of stainless steel and having a portion thereof comprising an erosion-resistant overlay.

3. The feed nozzle assembly of claim 2 wherein said outlet end is substantially hemi-spherical and wherein said at least one elongated slit is substantially centered on said substantially hemi-spherical or hemi-elliptical outlet end of said second nozzle tip.

4. The feed nozzle assembly of claim 2:

a. having at least two elongated slits in said second nozzle tip;

b. having at least two rows of passageways in said first nozzle tip; and c. wherein an outer diameter of said annular outer liquid conduit is from about 2 inches to about 9 inches and wherein said at least two elongated slits in said second nozzle tip are substantially crescent shaped.

5. The feed nozzle assembly of claim 4 wherein an outer diameter of said annular outer liquid conduit is from about 5 inches to about 7 inches.

6. The feed nozzle assembly of claim 2, wherein said passageways in said first nozzle tip comprise at least two rows, each of said at least two rows comprising a plurality of holes therein.

7. The feed nozzle assembly of claim 6, wherein each of said at least two rows in said first nozzle tip, has from about 7 to about 15 holes therein.

8. The feed nozzle assembly of claim 6 wherein each of said plurality of holes has a diameter from about one-sixteenth inch to about one-quarter inch.

9. The feed nozzle assembly of claim 2 wherein said distance between said first nozzle tip and said second nozzle tip is from about one-half inch to about one inch.

\* \* \* \* \*